Nov. 28, 1939.  H. STUVA  2,181,824
TRACTOR CULTIVATOR
Filed Nov. 7, 1938  2 Sheets-Sheet 1
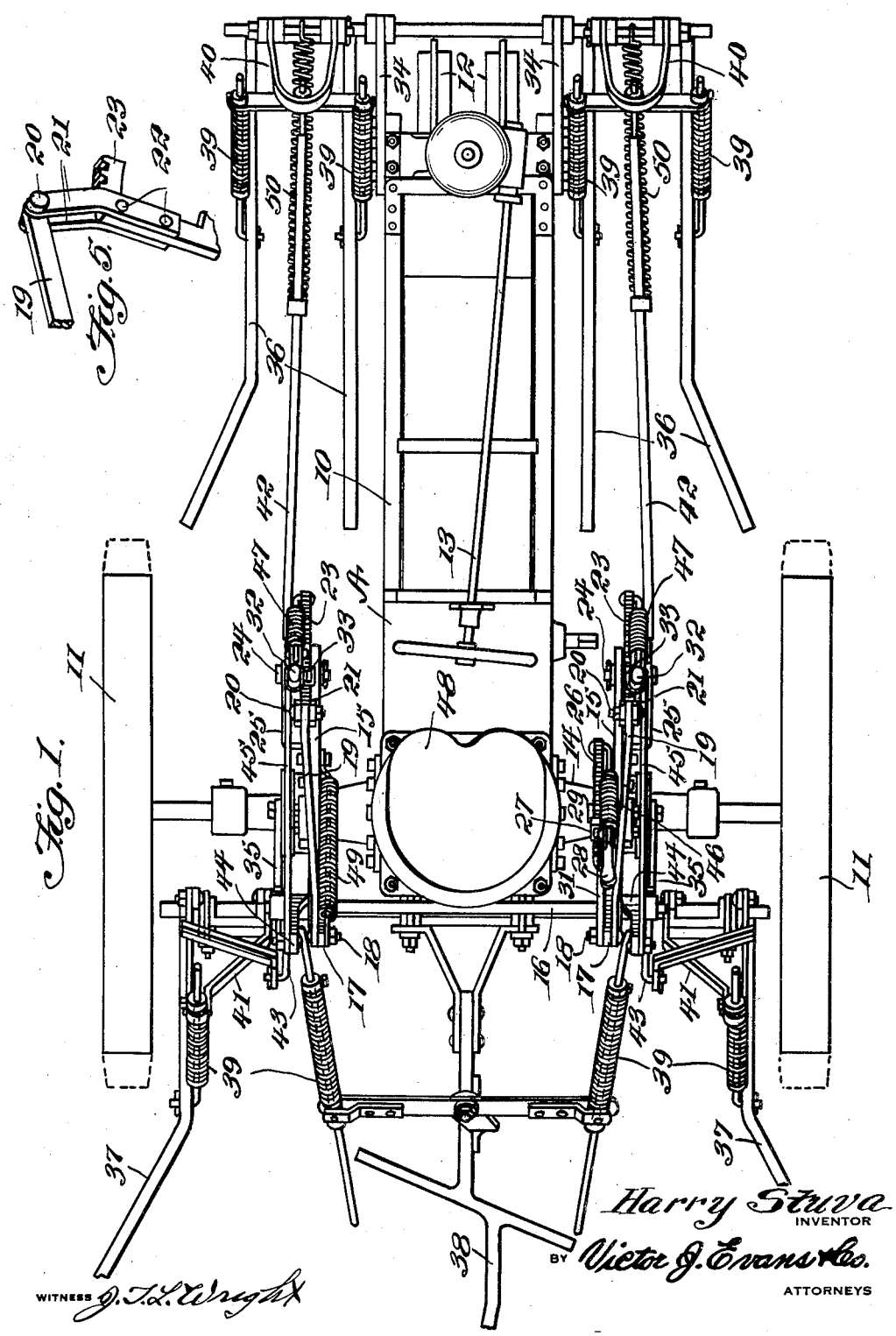

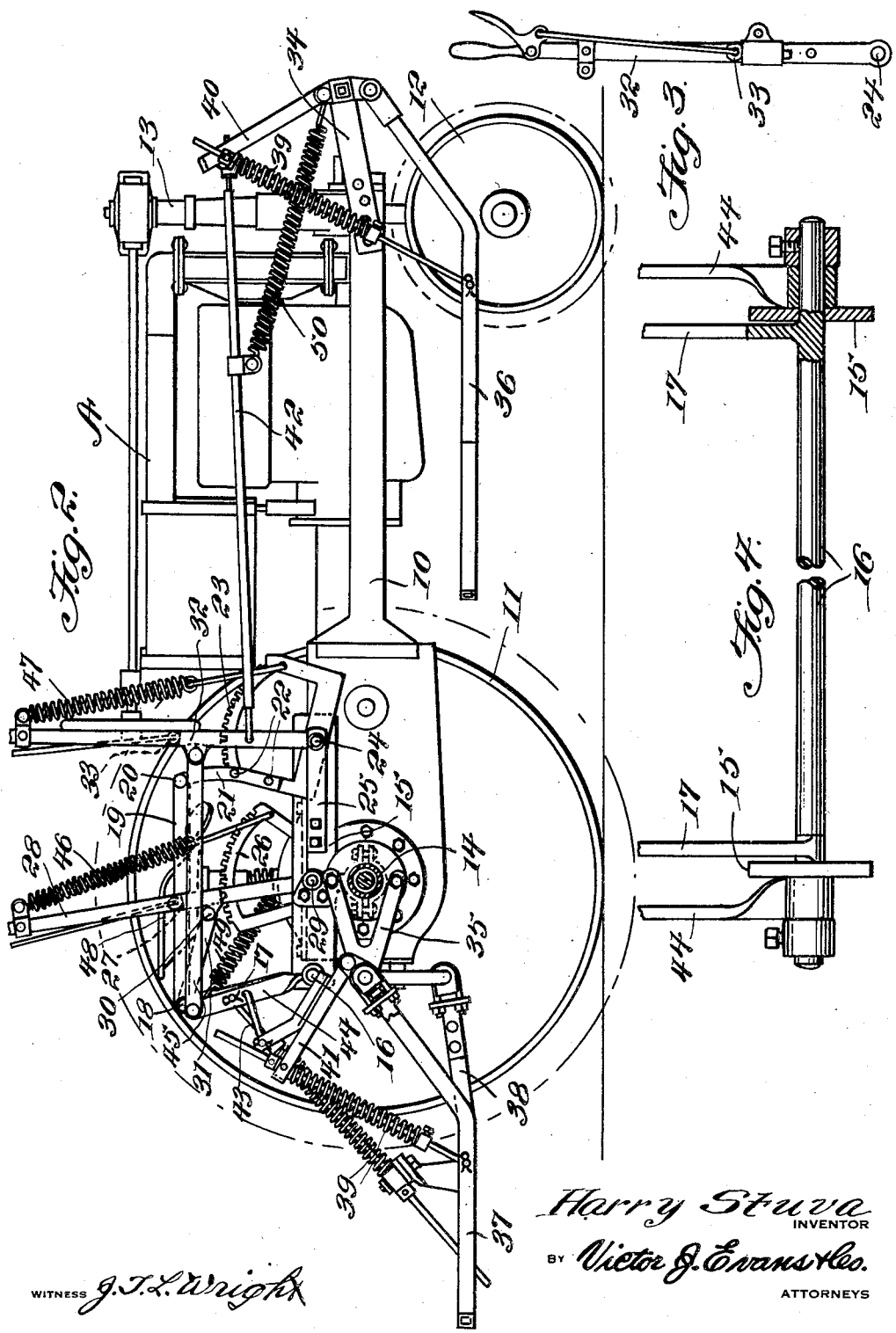

Patented Nov. 28, 1939

2,181,824

UNITED STATES PATENT OFFICE 2,181,824

TRACTOR CULTIVATOR

Harry Stuva, Corning, Iowa

Application November 7, 1938, Serial No. 239,350

5 Claims. (Cl. 97—47)

The invention relates to a tractor cultivator and more especially to a separable cultivator attachment for tractors.

The primary object of the invention is the provision of an attachment of this character, wherein on the mounting thereof the control of the shovels of the cultivator mechanism can be had with dispatch, that is to say, those on the right or left sides being operable independently of each other for the raising and lowering selectively thereof and additionally all of the shovels of the cultivator mechanism can be raised and lowered in unison with each other, the controls being readily accessible and by reason of the construction and arrangement thereof enable operation with minimum manual power.

Another object of the invention is the provision of an attachment of this character, wherein the construction thereof is novel in that it can be readily released from the tractor and when attached to the tractor assures power for the easy and quick lifting of the shovels of the cultivator and selective control of the shovels at both sides of the tractor, the parts of the attachment being interchangeable from the left side to the right side of the tractor and thus effecting economy in the manufacture of said attachment.

A still further object of the invention is the provision of an attachment of this character, wherein the master control is placed either on the right hand side or left hand side of the tractor so as to accommodate a left handed or right handed man or operator, the supplementary auxiliary control levers being handy for the adjustment of the shovels selectively at either side of the tractor.

A still further object of the invention is the provision of an attachment of this character, wherein the cultivator on arriving at the end of the row is not required to stop for the turning thereof in that the cultivator mechanism can be lifted in its entirety and the rows worked in a planted field without the necessity of stopping at the end of the rows as is customary due to the fact that the cultivator mechanism can be lifted bodily to avoid working activity at the time of the turn of the tractor.

A still further object of the invention is the provision of an attachment of this character, wherein the cultivator mechanism can be adjusted with dispatch and thus meeting the necessity of a sudden lift of the shovels without the stopping of the tractor under advancement thereof.

A still further object of the invention is the provision of an attachment of this character, which is simple in its construction, thoroughly reliable and efficient in operation, effecting a dual control, readily and easily attached to and removed from a tractor, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of the attachment applied to a tractor and constructed in accordance with the invention.

Figure 2 is a side elevation partly in section.

Figure 3 is an elevation of one of the control levers.

Figure 4 is an elevation partly in section of a cranked turning shaft of the attachment.

Figure 5 is a perspective view of a rocking keeper segment of the attachment.

Similar reference characters indicate corresponding parts throughout the several views in the drawings.

Referring to the drawings in detail, A designates generally a tractor, which is the propelling means for the cultivator attachment constituting the present invention, and such tractor may be of any suitable type. As shown, the tractor has its chassis frame indicated at 10, its rear power wheels at 11, front steering wheels at 12, these being controlled by steering mechanism 13, as usual. The tractor has its differential mechanism incased in a housing 14 and is of conventional kind.

The attachment constituting the present invention comprises a pair of elongated flat plates 15, these being arranged at opposite sides of the tractor A and each is clamped or otherwise secured to the housing 14 to be held in place. Journaled transversely of the tractor A at the rear end thereof in the plates 15 is a rocking shaft 16 which is formed with the cranks 17 to which are pivoted at 18 links 19, these being pivoted at 20 to brackets 21. The brackets are fixed at 22 to rocking keeper segments 23 pivoted at 24 in hangers 25 on the plates 15.

One of the plates 15 has connected thereto or as a part of the same a fixed keeper segment 26 with which cooperates the hand released latching device 27 on a master throw lever 28 pivoted at 29 for rocking or swinging movement. The lever 28 has pivoted at 30 thereto a connecting link 31 which is connected to the pivot 18 for the links 19.

The pivots 24 for the segments 23 support auxiliary throw levers 32, each having a hand released spring latching device 33 cooperating with the keeper segment 23. Bracketed at 34 and 35, respectively, fore and aft of the tractor A are front and rear side gangs of cultivator beams 36, 37 and 38, respectively, for supporting the ground working implements or cultivator shovels (not shown). These gangs of beams have tensioned connections 39 with swingable raising and lowering members 40 and 41, respectively. The members 40 have connection with throw rods 42 attached to the levers 32 while the members 41 have adjustable connections at 43 with swinging arms 44 loose on the shaft 16. These arms 44 through pivotally connected links 45 are attached to the levers 32. Thus when each lever 32 is operated manually, the gangs 36, 37 and 38 of ground working implements or cultivator shovels will be raised or lowered. That is to say, the gangs at one side of the tractor A will be operable independently of those at the other side of said tractor for the raising and lowering of such gangs.

Now when the master lever 28 is actuated, the entire gangs at both sides of the tractor can be lifted simultaneously or lowered into ground working position.

The lever 28 has coacting therewith a tensioning device 46 and each lever 32 has coacting therewith a tensioning device 47, respectively, these devices being connected with the segments 23 and 26. The segments 23 are common to the shafts 32 while the segment 26 is common to the shaft 28. The couplings for the plates 15 are readily separable from the housing 14 of the tractor A and likewise the brackets 34 are readily separable from attachment to the said tractor so that the cultivator attachment can be readily removed from the tractor.

The levers 28 and 32 are raised convenient to an operator of the tractor when riding the latter. The operator's seat of the tractor A is indicated at 48.

By reason of the leverage arrangement of the attachment the gangs of the ground working implements or cultivator plows are easy of manipulation so that an operator can control the attachment without excessive labor in that the control levers operate easily, requiring a minimum of manual power for the throwing thereof.

One of the cranks 17 has connected to it a tensioning spring 49 while the throw rod 42 has connected to it a tensioning spring 50. The latching devices 30 and 32 cooperate with the segments companion thereto.

The levers 28 and 32 when adjustably latched with the segments hold the gangs of ground working implements or cultivator shovels set in their adjusted positions and by manipulation of these levers, the implements or shovels can be readily pulled out of the ground or forced into the same, the latter being for the cultivating operation of the tractor cultivator.

The gangs of implements or shovels are yieldably suspended to pass obstructions and to be maintained in working position during the cultivating operation.

The attachment, particularly when cultivating rough ground or land, is of great value because there are many times when the gangs of ground working implements or shovels must be lifted suddenly and this is effective without stopping the tractor and also the gangs of implements or shovels are susceptible of control at either side of the tractor.

What is claimed is:

1. A cultivator attachment for a tractor having a chassis frame and a transmission housing, comprising a pair of plates having coupling with the housing, a master lever swingably attached to one of said plates, auxiliary levers swingably attached to said plates, brackets fixed to the chassis frame, a rocking shaft journaled in said plates and having cranks, swingable keeper segments associated with the auxiliary levers, shovel gangs arranged at opposite sides of the tractor, raising and lowering arms having connection with said gangs, connections between said arms and said auxiliary levers, a stationary keeper sector associated with the master lever, linkage between the swinging segments and said cranks, and a link connection between the master lever and one of said cranks.

2. A cultivator attachment for a tractor having a chassis frame and a transmission housing, comprising a pair of plates having coupling with the housing, a master lever swingably attached to one of said plates, auxiliary levers swingably attached to said plates, brackets fixed to the chassis frame, a rocking shaft journaled in said plates and having cranks, swingable keeper segments associated with the auxiliary levers, shovel gangs arranged at opposite sides of the tractor, raising and lowering arms having connection with said gangs, connections between said arms and said auxiliary levers, a stationary keeper sector associated with the master lever, linkage between the swinging segments and said cranks, a link connection between the master lever and one of said cranks, and tensioning devices associated with said levers.

3. A cultivator attachment for a tractor having a chassis frame and a transmission housing, comprising a pair of plates having coupling with the housing, a master lever swingably attached to one of said plates, auxiliary levers swingably attached to said plates, brackets fixed to the chassis frame, a rocking shaft journaled in said plates and having cranks, swingable keeper segments associated with the auxiliary levers, shovel gangs arranged at opposite sides of the tractor, raising and lowering arms having connection with said gangs, connections between said arms and said auxiliary levers, a stationary keeper sector associated with the master lever, linkage between the swinging segments and said cranks, a link connection between the master lever and one of said cranks, tensioning devices associated with said levers, and latching devices carried by the levers and engageable with the segments.

4. A cultivator attachment for a tractor having a chassis frame and a transmission housing, comprising a pair of plates having coupling with the housing, a master lever swingably attached to one of said plates, auxiliary levers swingably attached to said plates, brackets fixed to the chassis frame, a rocking shaft journaled in said plates and having cranks, swingable keeper segments associated with the auxiliary levers, shovel gangs arranged at opposite sides of the tractor, raising and lowering arms having connection with said gangs, connections between said arms and said auxiliary levers, a stationary keeper sector associated with the master lever, linkage between the swinging segments and said cranks, a link connection between the master lever and one of said cranks, tensioning devices associated with said levers, latching devices carried by the levers and engageable with the segments, and means separably connecting the swinging arms to the tractor.

5. A cultivator attachment for a tractor having a chassis frame and a transmission housing, comprising a pair of plates having coupling with the housing, a master lever swingably attached to one of said plates, auxiliary levers swingably attached to said plates, brackets fixed to the chassis frame, a rocking shaft journaled in said plates and having cranks, swingable keeper segments associated with the auxiliary levers, shovel gangs arranged at opposite sides of the tractor, raising and lowering arms having connection with said gangs, connections between said arms and said auxiliary levers, a stationary keeper sector associated with the master lever, linkage between the swinging segments and said cranks, a link connection between the master lever and one of said cranks, tensioning devices associated with said levers, latching devices carried by the levers and engageable with the segments, means separably connecting the swinging arms to the tractor, and tensioning means associated with the plow gangs.

HARRY STUVA.